US011799347B2

(12) United States Patent
Shakirov et al.

(10) Patent No.: US 11,799,347 B2
(45) Date of Patent: Oct. 24, 2023

(54) AXIAL SUPPORT SHOE UNIT OF OIL-FILLED SUBMERSIBLE MOTOR

(71) Applicant: Lex Submersible Pumps FZE Company, Moscow (RU)

(72) Inventors: Anton Shakirov, Moscow (RU); Vitaly Koropetskiy, Moscow (RU); Iaroslav Alekseev, Moscow (RU); Vadim Batalov, Moscow (RU); Anton Gorislavskiy, Tbilisi (GA); Anton Shkolnyi, Lviv (UA)

(73) Assignee: Lex Submersible Pumps FZE Company, Moscow (RU)

( * ) Notice: Subject to any disclaimer, the term of this patent is extended or adjusted under 35 U.S.C. 154(b) by 0 days.

(21) Appl. No.: 17/993,078

(22) Filed: Nov. 23, 2022

(65) Prior Publication Data

US 2023/0170759 A1    Jun. 1, 2023

Related U.S. Application Data

(60) Provisional application No. 63/283,342, filed on Nov. 26, 2021.

(51) Int. Cl.
*H02K 5/12* (2006.01)
*H02K 5/132* (2006.01)
*H02K 7/00* (2006.01)
*H02K 7/08* (2006.01)

(52) U.S. Cl.
CPC ............ *H02K 5/132* (2013.01); *H02K 7/003* (2013.01); *H02K 7/08* (2013.01)

(58) Field of Classification Search
CPC .......... H02K 5/132; H02K 7/003; H02K 7/08
USPC ........................................................... 310/90
See application file for complete search history.

(56) References Cited

U.S. PATENT DOCUMENTS

| 4,874,302 A * | 10/1989 | Kobayashi | .......... F04C 18/0215 418/55.6 |
| 10,323,644 B1 * | 6/2019 | Shakirov | ................. F04D 13/10 |
| 10,385,856 B1 * | 8/2019 | Shakirov | ............... F04D 13/086 |
| 10,822,903 B2 * | 11/2020 | Ye | ........................... E21B 25/02 |

* cited by examiner

*Primary Examiner* — Terrance L Kenerly
(74) *Attorney, Agent, or Firm* — G. MICHAEL ROEBUCK, PC

(57) ABSTRACT

A heel assembly of a submersible oil-filled electric motor contains a thrust bearing and an annular heel having grooves, enabling pumping liquid into the grooves when the heel rotates. The heel assembly is made with a through channel for fluid flow. At least part of the surface of the channel is formed by the inner annular surfaces of the heel and thrust bearing, and the above grooves are arcuate and form at least the first and second group of grooves. In the first group of grooves, each groove is made with an end closed for the fluid flow and with an end open for the fluid flow, located on the outer boundary of the annular heel with an outer diameter D1. In the second group of grooves, each groove is made with an end closed for the fluid flow and with an end open for the fluid flow.

15 Claims, 2 Drawing Sheets

AXIAL SUPPORT SHOE UNIT OF OIL-FILLED SUBMERSIBLE MOTOR

CROSS REFERENCE TO RELATED APPLICATIONS

This patent application claims priority from U.S. Provisional Patent application Ser. No. 63/283,342 entitled Axial Support Shoe Unit Of Oil-Filled Submersible Motor filed by Anton Shakirov on 26 Nov. 2021, which is hereby incorporated by reference in its entirety. This patent application claims priority from U.S. patent application Ser. No. 17/717,889 filed on Apr. 11, 2022 entitled A METHOD AND APPARATUS FOR A SUBMERSIBLE MULTISTAGE LABYRINTH-SCREW PUMP, which is hereby incorporated by reference herein in its entirety. This patent application also claims priority from U.S. Provisional patent application Ser. No. 63/298,734 by ANTON Shakirov entitled A METHOD AND APPARATUS FOR A SUBMERSIBLE MULTISTAGE LABYRINTH-SCREW PUMP filed on Jan. 12, 2022, which is hereby incorporated by reference herein in its entirety; this patent application also claims priority from U.S. Provisional patent application Ser. No. 63/283,340 by ANTON Shakirov entitled Submersible Oil-filled Permanent Magnet Electric Motor, filed on 26 Nov. 2021, which is hereby incorporated by reference herein in its entirety; and this patent application claims priority from U.S. Provisional patent application Ser. No. 63/283,343 by ANTON Shakirov entitled Submersible Pump Unit Drive with Heat Exchanger filed on 26 Nov. 2021, which is hereby incorporated by reference herein in its entirety.

BACKGROUND OF THE INVENTION

RU 2219372, publ. 2003 discloses a support shoe assembly, wherein a submersible oil-filled motor of a submersible centrifugal pump containing a housing, axial support, including a support shoe fixed to the shaft, and a fixed thrust bearing. The bearing foot of the axial support is fixed on the motor rotor shaft. For high-speed submersible motors, in the specified design of the support, effective unloading is not ensured due to significant friction in the contact zone of the working surfaces of the support shoe and thrust bearing, which increases the likelihood of destruction of the support shoe assembly.

RU No. 51145, publ. 2006 discloses a support shoe assembly, wherein a submersible oil-filled electric motor is disclosed with a chevron configuration of oil grooves on the support shoe surface. The submersible oil-filled electric motor is made with the possibility of installation on the shaft and contains a thrust bearing and an annular support shoe. On the working surface of the support shoe, chevron grooves are formed, made with the possibility of forcing liquid into them during the rotation of the support shoe. This technical solution provides lubrication, in particular, for the surface areas of the triboconjugation (support shoe-thrust), adjacent respectively to the outer and inner boundaries of the annular support shoe. However, in such a technical solution, each chevron groove is through (it has ends open for fluid flow both on the outer boundary and on the inner boundary of the annular support shoe). This technical solution makes it possible to provide lubrication of the above areas of the support shoe but at the same time cannot ensure the operation of the support shoe assembly as a mechanical seal due to the presence of unwanted fluid flows over the surface of the support shoe, which violates the tightness.

FIELD OF THE INVENTION

The present invention relates to oil-producing equipment, namely to submersible high-speed electric motors (hereinafter referred to as SEM) of centrifugal submersible pumps, namely to the nodes of axial supports (shoe) placed on the shaft in the section of the submersible electric motor.

DETAILED DESCRIPTION OF AN ILLUSTRATIVE EMBODIMENT OF THE INVENTION

Figure 1:
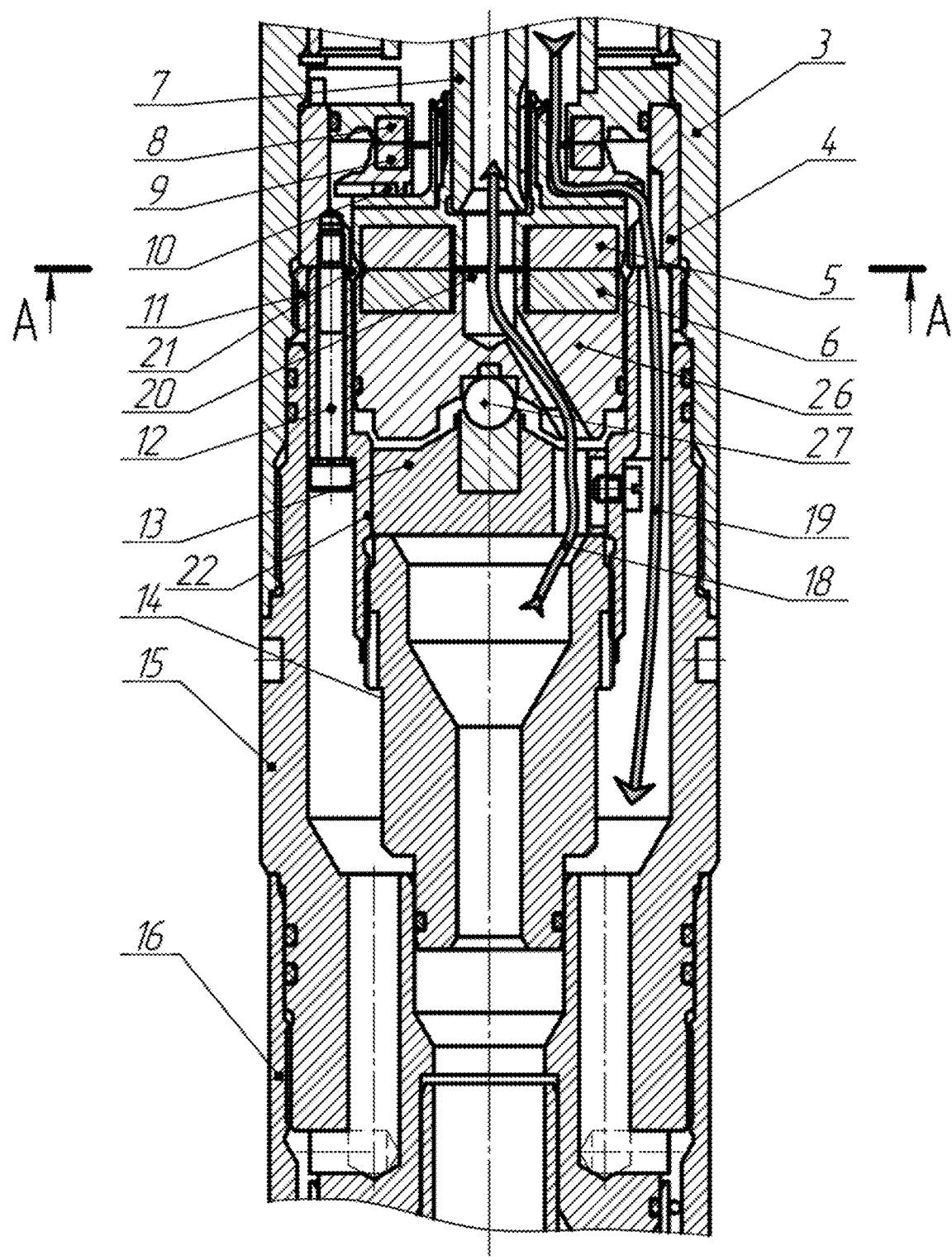
FIG. 1 is a schematic depiction of a side cross sectional view of the site of the support shoe of the submersible oil-filled motor, installed between the motor and the heat exchanger in a particular illustrative embodiment of the invention.

The specification and drawings are to be regarded in an illustrative rather than a restrictive sense. It will be evident that additions, subtractions, deletions, and other modifications and changes may be made thereunto without departing from the broader spirit and scope of the inventions as set forth in the claims set forth below. Accordingly, the inventions are therefore to be limited only by the scope of the appended claims. None of the claim language should be interpreted pursuant to 35 U.S.C. 112(f) unless the word "means" is recited in any of the claim language, and then only with respect to any recited "means" limitation. The drawings are drawn to scale.

A particular illustrative embodiment of the invention is disclosed wherein an apparatus provides a durable support shoe assembly for use in a high-speed (more than 3000 rpm) oil-filled submersible motor (with a heat exchanger attached below), which acts as effective axial support for the motor shaft (for example, an axial sliding bearing) and a mechanical seal (sealing device, related to the contact type of seals with a pair of friction surfaces of two parts). The support shoe assembly facilitates efficient circulation of coolant (dielectric oil) through the oil lines between the heat exchanger and the oil-filled motor. The support shoe assembly (as an axial sliding bearing with a support shoe-thrust tribological interface) functions reliably, in particular, in a device—a submersible oil-filled motor with a heat exchanger with forced circulation of the lubricating fluid. Such devices may contain pumping elements for circulating oil, which are usually mounted as a separate element on the shaft. Thanks to the use of the support shoe assembly (which is located at the end of the shaft (rotor) of the electric motor), the efficiency of the circulation circuit of the submersible electric motor (the quality of cooling and the resource in general) and, in general, the reliability of the operation of the electric motor under conditions of increased loads should increase. In a particular illustrative embodiment of the invention, under the liquid in this solution is a dielectric oil type lubricating and cooling liquid used in an oil-filled submersible motor.

In a particular illustrative embodiment of the invention, a support shoe assembly for a high-speed pump, increases the efficiency of contact lubrication in the operating mode of the pump is provided (in particular, for the surface areas of the tribo-coupling adjacent to the outer and inner boundaries of the annular support shoe, respectively). In a particular illustrative embodiment of the invention, the support shoe assembly ensures tightness in the tribo-coupling, in particular, the prevention of liquid overflows between the area of contact of the annular support shoe (from the inner boundary area of the support shoe) and the liquid from the outer region (from the outer boundary side of the support shoe). In a particular illustrative embodiment of the invention, the support shoe assembly substantially prevents mutual lubricant overflows (coolant such as oil) from the above areas on the surface of the support shoe, increasing the efficiency of contact lubrication (in the above tribo-couple) when using forced oil circulation in a drive system containing a submersible oil-filled electric motor. In a particular illustrative embodiment of the invention, the support shoe assembly provides efficient operation of a circulation circuit into a heat exchanger with oil pipelines and enabling the effective operation of the support shoe assembly (with an increase in its load capacity and resource) and for cooling systems of a submersible electric motor having an internal channel for the passage of liquid (oil) inside a hollow shaft (rotor) of the electric motor.

To achieve the claimed technical results in a support shoe assembly of a submersible oil-filled electric motor, a particular illustrative embodiment of the invention is configured to install the support shoe on a shaft containing a thrust bearing and an annular support shoe having grooves on a working surface of the support shoe, for injecting liquid into the grooves during support shoe rotation, wherein the support shoe assembly is provided with a through channel for fluid flow. At least part of the surface of the through channel is formed by inner annular surfaces of the support shoe and thrust bearing, wherein the grooves are arcuate and form at least a first and a second group of grooves. In a first group of grooves, each groove is configured with a closed end for the fluid flow and with an open end for the fluid flow, located on an outer boundary of the annular support shoe, having an outer diameter D1. In the second group of grooves, each groove is configured with a closed end for the fluid flow and with an open end for the fluid flow, located on an inner border of the annular support shoe with an inner diameter D2.

Any groove from the first group of grooves is located at a distance greater than its groove width from any groove from the second group of grooves, and the depth of the above grooves from the first and second groups is from 0.3 mm to 1 mm. All of the above grooves can be placed on the support shoe surface in such a way that, on the support shoe surface there is formed at least one conditional circle with a diameter D0, where D2<D0<D1, having a center coinciding with the center of a support shoe bearing ring on the working surface, and which intersects with all grooves from the first and second groups of grooves. In a particular illustrative embodiment of the invention, all of the grooves in the first group of grooves has a same first shape and size, and all of the grooves in the second group of grooves has a same second shape and size. The first group of grooves contains at least two arcuate grooves, wherein the open ends of the grooves from the first group are evenly spaced along an outer boundary of the support shoe, and the second group of grooves contains at least two arcuate grooves, wherein the open ends of the grooves for fluid flow from the second group are located evenly along the inner border of the support shoe. In an upper part of the support shoe assembly, a pump stage is made to form a forced circulation of liquid in the form of oil between the electric motor and the heat exchanger connected to the electric motor from below. The support shoe assembly is configured to be installed at the lower end of a motor shaft between the electric motor and the heat exchanger. The motor shaft is made hollow, while the through channel for the fluid passage of the support shoe assembly is made with the possibility of its tight connection with the lower opening of the oil channel formed in the inner axial cavity of the hollow shaft.

In a particular illustrative embodiment of the invention, the support shoe assembly is part of a submersible motor (located above the support shoe assembly) connected to a heat exchanger (located below the support shoe assembly) and can provide forced oil circulation (in the case of the support shoe with a pump) inside the motor to cool it (in one of the versions), it also allows the return flow of oil from the heat exchanger in the engine to pass through it, at the same time it also acts as an axial support and mechanical seal. Thus, the support shoe assembly plays the role of axial support, which is transferred to the bottom of the rotor to be used as a mechanical seal (support shoe-thrust) to ensure reliable operation of the heat exchange circuit (liquid (oil) circulation circuit). In addition, the support shoe can act as a booster pump (when organizing forced circulation of the liquid).

Figure 4:
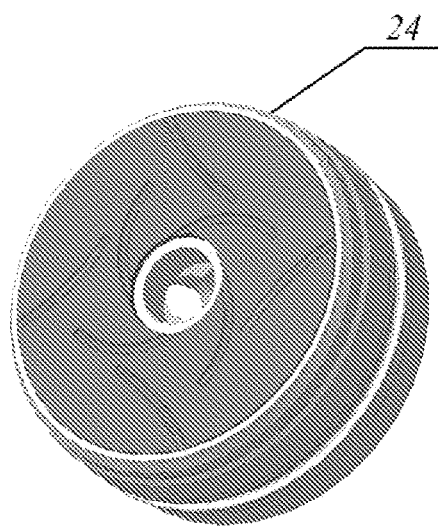
FIG. 4 is a schematic depiction of perspective view of an upper part of the support shoe assembly in three dimensions in a particular illustrative embodiment of the invention.

The structure of the support shoe assembly, in particular, includes the upper part of the support shoe assembly 24 (see FIG. 4), the thrust bearing block, containing, in particular, the body of the thrust bearing block 22, the thrust bearing 6 installed in the upper element of the thrust bearing 26, made with a section of the through channel for the duct liquid, the lower element of the thrust bearing 13 is made with a section for the through flow of fluid, the central element 27. The annular support shoe 5 (the bearing ring of the support shoe assembly) rotates along the annular thrust bearing 6 of the axial support (the bearing ring of the thrust bearing assembly).

The upper element of the thrust bearing 26 retains the possibility of a slight angular displacement and corresponding adjustment of the working surface of the thrust bearing to the position of the working surface of the support shoe 5, since the upper element 26 can be fixed with an elastic ring and has a fulcrum on the central (balancing) element 27 (for example, of the type of a hinge element). The combination of the ability to adjust the position of the support shoe and thrust bearing with arc tracks 1, 2 contributes to the organization of a more optimal lubrication regime on the support shoe with arc tracks (in particular, a more uniform arrangement of the lubricating fluid and the maximum reduction of unwanted overflows). The body of the thrust bearing block 22 is located in the connecting flange 15 of the heat exchanger installed in the heat exchanger housing 16. The body of the thrust bearing block 22 is attached to the guide vane 4 (for the pump 17 on the support shoe) with screws 12.

Figure 2:
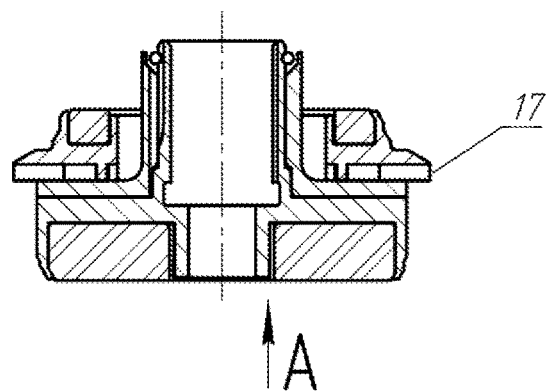
FIG. 2 is a schematic depiction of cross sectional view A of FIG. 1, wherein an upper part of the support shoe assembly (the support shoe combined with the pump) in section A in a particular illustrative embodiment of the invention.

In a particular illustrative embodiment of the invention, the upper part of the support shoe assembly 24 (see FIG. 1, FIG. 2) can be made as a support shoe 5, combined with the pump 17, including one pump stage with an impeller with blades 10 and a thrust ring 9. The pump stage with an impeller with blades 10 can provide enhanced forced circulation of the system oil (providing an effective lubrication regime) together with another pump element made on the motor shaft (not shown). The upper part of the support shoe assembly 24 is located on shaft 7 inside the guide vane 4, which, in turn, is installed in the motor housing 3 and fixed with a nut 11. The support shoe is protected from floating by ring 9 located on pump 17, the gap between it and the response ring 8 is adjusted using a screw block 14.

Figure 3:
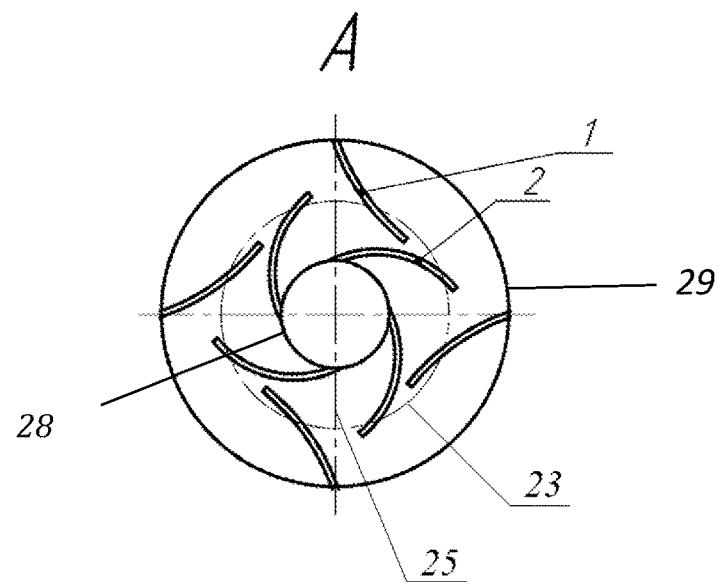
FIG. 3 is a schematic depiction of a cross sectional view A of FIG. 2, depicting a working surface of the support shoe with arc grooves in a particular illustrative embodiment of the invention.

On the working surface of the support shoe 5 is made grooves arc-shaped, which can be divided into at least two groups of grooves (see FIG. 3). In the first group of grooves 1, each groove is made with an end closed for the flow of liquid (i.e., a "blind" end) and with an end open for the flow of liquid, located on the outer boundary of the annular support shoe 5. In the second group of grooves 2, each groove is made with a closed for fluid flow end (i.e. "blind" end) and open to the fluid flow end located on the inner boundary of the annular support shoe 5 located at a distance greater than its groove width from any of the grooves of the second group of grooves.

The grooves can be placed on the surface of the support shoe so that on the surface of the support shoe there is at least one conditional circle 23 (see FIG. 3) with a diameter D0 23 where D2 28<D0 23<D1 29, (where the outer and inner diameters of the annular support shoe D1,D2) having a center coinciding with the center of the support shoe bearing ring (this is the conditional center of the annular support shoe lying on the plane coinciding with the plane of the working support shoe), which intersects with all the grooves from the first and second groups of grooves. This distribution improves the quality of lubrication over the entire working surface of the support shoe. The depth of the above grooves from the first and second groups is from 0.3 mm to 1 mm, while all the grooves from the first group of grooves 1 have (i.e. among themselves) the same shape and size, and all the grooves from the second group 2 grooves have (i.e. each other) of the same shape and size. The specified geometric shapes of the grooves (and their configuration) contribute to the optimal distribution of lubricant over the working surface of the support shoe (to be more precise, the area of the support shoe-toe tribo-contact) and improve the quality of the liquid lubrication regime for high-speed modes of the support shoe while ensuring the tightness of the mechanical seal.

In a particular illustrative embodiment of the invention, the support shoe assembly of the oil-filled engine in the operating mode of the pumping unit operates as follows. From the zone of the oil-filled electric motor, the hot oil flow from the engine goes down to the heat exchanger zone through the oil circulation channel with the oil flow direction 19. At the same time, part of the passing oil from this channel (changing part of the already existing oil in the grooves that entered the internal cavity 21 before the start of pump operation) can get into the arc grooves of the first group 1, and thus the optimal lubrication regime is ensured in the corresponding area of the foot-to-thrust tribo-contact (and the required level of oil supply is provided). Further, the cooled oil from the heat exchanger flows back through the oil circulation channel with the direction of the oil flow 18—upwards into the oil-filled cavity of the electric motor. In particular, it passes through a through channel made in the support shoe assembly, in particular, through sections of the through channel for fluid flow in the lower element of the thrust bearing 13, the upper element of the thrust bearing 26 and through the channel section formed by the inner annular surfaces of the support shoe 5 and the thrust bearing 6.

Part of this oil can enter the arc grooves of the second group 2 (replacing part of the already existing oil that got into the second group of grooves from the internal oil cavity 20 before the pump starts) and thus the optimal lubrication mode is ensured (and the required level of oil supply is provided) in the corresponding zone of the foot-thrust tribocontact, then the oil enters the axial channel formed in the hollow shaft 7 of the shaft (rotor) of the electric motor. At the same time, undesirable liquid overflows between channels with different flow directions are minimized and, accordingly, there are no undesirable overflows ("stray" channels) in the support shoe area, in particular, from the channel from flow direction 19 (with hot oil) to the channel with flow direction 18 (through the support shoe), or from other external cavities surrounding the support shoe (such as cavity 21), disrupting the effective circulation of the coolant through the heat exchanger.

In a particular illustrative embodiment of the invention, the support shoe assembly, some features of the operation of the support shoe assembly in the area of the tribocontact (support shoe-thrust) are now more detail. If the support shoe friction surface is made with grooves 1 and 2 (filled with lubricant), the support shoe 1 rotates on shaft 7 and ensures effective lubrication of the tribological interface. When the support shoe rotates (in any case, the grooves are made on the friction surfaces of the support shoe), the lubricant is injected into the groove zone of the first and second groups of grooves, and increased hydrodynamic pressure is created in the lubricant film in a certain area of the friction surface, a certain configuration of the grooves. The hydrodynamic pressure in this zone determines the fluid friction mode, which ensures the operation of the unit at higher loads. To provide lubrication for increased bearing capacity, lubrication grooves 1, 2 of an arc shape with corresponding blind ends (an effective form for capturing lubricating fluid during rotation of the support shoe) are used, which also prevent the possibility of oil overflow from cavity 21 (at increased pressure in it) into cavity 20 and providing lubrication under increased pressure due to the geometry and arrangement of the grooves.

The arcuate shape of the grooves ensures greater efficiency in the high-speed operation of the pump (and, accordingly, the support shoe) than similar straight-shaped grooves. The arcuate grooves of the first part (outer grooves) can be made in identical shapes and sizes. Each such groove can be made equally oriented with respect to the conditional straight line 25 passing along the working surface of the support shoe through the center of the support shoe and through the end of the groove open to the fluid flow. (see FIG. 3). This orientation also improves the efficiency of lubrication of the pads of the support shoe. Note that it is also possible to make grooves on the support shoe surface and/or on the support shoe surface (mirror-like in relation to the support shoe configuration). A particular illustrative embodiment of the invention is a support shoe assembly industrially implemented and mass-produced.

In a particular illustrative embodiment of the invention, a heel assembly of the submersible oil-filled electric motor contains a thrust bearing and an annular heel having grooves on the working surface, enabling pumping liquid into the grooves when the heel rotates. The heel assembly is made with a through channel for fluid flow. At least part of the surface of the channel is formed by the inner annular surfaces of the heel and thrust bearing, and the above grooves are arcuate and form at least the first and second group of grooves. In the first group of grooves, each groove is made with an end closed for the fluid flow and with an end open for the fluid flow, located on the outer boundary of the annular heel with an outer diameter D1. In the second group of grooves, each groove is made with an end closed for the fluid flow and with an end open for the fluid flow, located on the inner border of the annular heel with an inner diameter D2. Any groove from the first group of grooves is located at a distance greater than its groove width from any groove from the second group of grooves, and the depth of the above grooves from the first and second groups is from 0.3 mm to 1 mm. In the upper part of the heel assembly, a pump stage can be made to form a forced circulation of liquid in the form of oil between the above electric motor and the heat exchanger connected to it from below, while the heel assembly is configured to be installed at the lower end of the motor shaft between the electric motor and the heat exchanger.

The invention claimed is:

1. An apparatus comprising:
   a support shoe assembly;
   a submersible oil-filled electric motor having a shaft, configured to install the support shoe assembly on the shaft;
   a thrust bearing contained in the support shoe assembly, wherein the support shoe assembly has an annular shape;
   grooves formed on a working surface of the support shoe assembly, wherein the grooves are configured for forcing liquid into the grooves during a rotation of the support shoe; and
   a through channel for liquid flow in the support shoe assembly has, wherein at least one section of the through channel is formed by an inner annular surface of the support shoe assembly and the thrust bearing, wherein the support shoe assembly is configured to be installed at a lower end of the motor shaft between the electric motor and a heat exchanger of the oil-filled electric motor, and wherein the grooves have an arc shape and form, the grooves further comprising at least a first and second groups of grooves, while in the first group of grooves each groove is made with a closed end for a fluid flow and with an open end for the fluid flow, located on an outer boundary of the annular support shoe with an outer diameter D1, wherein in the second group of grooves, each groove is made with an closed end for the fluid flow and with an end open for the fluid flow, located on a inner border of the annular support shoe with an inner diameter D2, while any groove from the first group of grooves is located at a distance greater than its width of the groove from any groove from the second groups of grooves, and a depth of grooves of the first and second groups of grooves is between a range from 0.3 mm to 1 mm.

2. The apparatus of claim 1, wherein the grooves are placed on a surface of the support shoe in such a way that on the surface of the support shoe there is at least one conditional circle with a diameter D0, where D2<D0<D1, having a center coinciding with the center of a bearing support shoe ring, which intersects with all the grooves from the first and second groups of grooves.

3. The apparatus of claim 1, wherein all the grooves from the first group of grooves have a first same shape and size and all the grooves from the second group of grooves have a second same shape and size.

4. The apparatus of claim 3, wherein the first group of grooves containing at least two arcuate grooves, and the open ends of the grooves from the first group are located evenly along the outer border of the support shoe, and the second group of grooves contains at least two arcuate grooves and the open the ends of the grooves for the fluid flow from the second group are evenly spaced along the inner border of the support shoe.

5. The apparatus of claim 1, wherein an upper part of a support shoe unit, a pump stage is made to form a forced circulation of liquid in the form of oil between the electric motor and the heat exchanger connected to it from below.

6. The apparatus of claim 1, wherein the motor shaft is made hollow, while the through channel for a fluid passage of the support shoe assembly is made with a tight connection with the lower opening of the oil channel formed in an inner axial cavity of the hollow shaft.

7. An apparatus comprising:
   a support shoe assembly;
   a submersible oil-filled electric motor having a shaft, configured to install the support shoe assembly on the shaft;
   a thrust bearing contained in the support shoe assembly, wherein the support shoe assembly has an annular shape;
   grooves formed on a working surface of the support shoe assembly, wherein the grooves are configured for forcing liquid into the grooves during a rotation of the support shoe; and
   a through channel for liquid flow in the support shoe assembly has, wherein at least one section of the through channel is formed by an inner annular surface of the support shoe assembly and the thrust bearing.

8. The apparatus of claim 7, wherein the support shoe assembly is configured to be installed at a lower end of the motor shaft between the electric motor a heat exchanger of the oil-filled electric motor.

9. The apparatus of claim 7, wherein the grooves have an arcuate shape, the grooves further comprising at least a first group of grooves and a second groups of grooves, while in a first group of grooves each groove is made with a closed end for a fluid flow and with an open end for the fluid flow, located on an outer boundary of the annular support shoe with an outer diameter D1.

10. The apparatus of claim 9, wherein in the second group without grooves, each groove is made with a closed end for the fluid flow and with an end open for the fluid flow, located on an inner border of the annular support shoe with an inner diameter D2, while any groove from the first group of grooves is located at a distance greater than its width of the groove from any groove from the second groups of grooves, and a depth of the grooves of the first group and the second group is a range from 0.3 mm to 1 mm.

11. The apparatus of claim 7, wherein the grooves are placed on a surface of the support shoe in such a way that on the surface of the support shoe there is at least one conditional circle with a diameter D0, where D2<D0<D1, having a center coinciding with a center of bearing support shoe ring, which intersects with all the grooves from a first and second group of grooves.

12. The apparatus of claim 7, wherein all the grooves from a first group of grooves have a first same shape and size and all the grooves from a second group of grooves have a second same shape and size.

13. The apparatus of claim 9, wherein the first group of grooves containing at least two arcuate grooves, and the open ends of the grooves from the first group are located evenly along an outer border of the support shoe, and the second group of grooves contains at least two arcuate grooves and the open ends of the grooves for the fluid flow from the second group are evenly spaced along an inner border of the support shoe.

14. The apparatus of claim 7, wherein an upper part of a support shoe unit, a pump stage is made to form a forced circulation of liquid in the form of oil between an electric motor and a heat exchanger connected to it from below.

15. The apparatus of claim 7, wherein the motor shaft is made hollow, while the through channel for a fluid passage of the support shoe assembly is made with a tight connection with a lower opening of the oil channel formed in an inner axial cavity of the hollow shaft.

* * * * *

UNITED STATES PATENT AND TRADEMARK OFFICE
CERTIFICATE OF CORRECTION

| | |
|---|---|
| PATENT NO. | : 11,799,347 B2 |
| APPLICATION NO. | : 17/993078 |
| DATED | : January 9, 2024 |
| INVENTOR(S) | : Shakirov et al. |

It is certified that error appears in the above-identified patent and that said Letters Patent is hereby corrected as shown below:

On the Title Page

Item (72) Inventor
Inventor 1 Anton Shakirov, Moscow (RU),
Change to Anton Shakirov, Limassol, Cyprus
Inventor 2 Vitaly Koropetskiy, Moscow (RU),
Change to Vitaly Koropetskiy, Tbilisi, Georgia
Inventor 3 Iaroslav Alekseev, Moscow (RU),
Change to Iaroslav Alekseev, Paphos, Cyprus
Inventor 4 Anton Shkolnyi, Lviv (UA)
Change to Anton Shkolnyi, Paphos, Cypress
Inventor 5 Anton Gorislavskiy, Tbilski (GA)
Change to Anton Gorislavskiy, Paphos, Cyprus Signed and Sealed this
Sixteenth Day of April, 2024

Katherine Kelly Vidal
*Director of the United States Patent and Trademark Office*